US 12,470,803 B1

(12) United States Patent
Yui et al.

(10) Patent No.: US 12,470,803 B1
(45) Date of Patent: Nov. 11, 2025

(54) GRAPHICAL USER INTERFACE FOR CONTROLLING EXPOSURE MODE OF AN IMAGE CAPTURE DEVICE

(71) Applicant: GoPro, Inc., San Mateo, CA (US)

(72) Inventors: Stephen Yui, Oakland, CA (US); Michelle Gelberger, San Mateo, CA (US); Grant Adam McCauley, San Mateo, CA (US); Abraham Kislevitz, Carlsbad, CA (US)

(73) Assignee: GoPro, Inc., San Mateo, CA (US)

( * ) Notice: Subject to any disclaimer, the term of this patent is extended or adjusted under 35 U.S.C. 154(b) by 13 days.

(21) Appl. No.: 18/431,689

(22) Filed: Feb. 2, 2024

(51) Int. Cl.
H04N 23/62 (2023.01)
H04N 5/262 (2006.01)
H04N 23/63 (2023.01)
H04N 23/667 (2023.01)
H04N 23/698 (2023.01)
H04N 23/73 (2023.01)

(52) U.S. Cl.
CPC ........... *H04N 23/62* (2023.01); *H04N 5/2624* (2013.01); *H04N 23/632* (2023.01); *H04N 23/667* (2023.01); *H04N 23/698* (2023.01); H04N 23/73 (2023.01)

(58) Field of Classification Search
CPC .... H04N 23/62; H04N 5/2624; H04N 23/632; H04N 23/667; H04N 23/698; H04N 23/73
See application file for complete search history.

(56) References Cited

U.S. PATENT DOCUMENTS

| | | | | |
|---|---|---|---|---|
| 6,738,073 B2 * | 5/2004 | Park | | G06T 5/50 |
| | | | | 348/E7.086 |
| 8,605,142 B2 * | 12/2013 | Hayashi | | H04N 7/181 |
| | | | | 348/54 |
| 9,948,858 B2 * | 4/2018 | Laroia | | H04N 23/15 |
| 10,200,624 B2 * | 2/2019 | Cabral | | H04N 23/71 |
| 10,230,904 B2 * | 3/2019 | Cabral | | H04N 23/90 |
| 10,291,828 B1 * | 5/2019 | Hsu | | H04N 23/698 |
| 10,638,052 B2 * | 4/2020 | Dhiman | | G06T 5/50 |
| 10,917,565 B1 * | 2/2021 | Gilmour | | G06F 9/30003 |
| 10,999,527 B1 * | 5/2021 | Guérin | | H04N 23/73 |
| 11,122,202 B2 * | 9/2021 | Hohjoh | | H04N 23/667 |
| 11,388,332 B2 * | 7/2022 | Watanabe | | H04N 23/634 |
| 2022/0006949 A1 * | 1/2022 | Watanabe | | G03B 37/04 |

* cited by examiner

*Primary Examiner* — Boubacar Abdou Tchoussou
(74) *Attorney, Agent, or Firm* — Esplin & Associates, PC

(57) ABSTRACT

An image capture device may include multiple lenses and multiple image sensors. The image capture device may operate in a multi-lens exposure mode or a single lens exposure mode. In the multi-lens exposure mode, the exposure setting of individual image sensors may be determined based on luminance of the scene included within the field of view of corresponding lenses. In the single lens exposure mode, the group exposure setting for all image sensors may be determined based on luminance of the scene included within the field of view of a single lens. The user may change the operation of the image capture device between the multi-lens exposure mode and the single lens exposure mode by interacting with an exposure mode element presented on an electronic display.

20 Claims, 8 Drawing Sheets

GRAPHICAL USER INTERFACE FOR CONTROLLING EXPOSURE MODE OF AN IMAGE CAPTURE DEVICE

FIELD

This disclosure relates to an image capture device with multiple image sensors that presents a graphical user interface to switch between different exposure modes for the multiple image sensors.

BACKGROUND

An image capture device may include multiple lenses and multiple image sensors. Independently setting exposure settings of different image sensors may result in mismatch in visual characteristics of visual content captured by different image sensors. Mismatch in visual characteristics may result in an uneven look when the separate visual content are combined.

SUMMARY

This disclosure relates to a graphical user interface for controlling exposure of multiple image sensors of an image capture device. The image capture device may include a housing. The housing may carry one or more of an electronic display, a first lens, a second lens, a first image sensor, a second image sensor, and/or other components. The electronic display may be configured to visually present information. The first lens may be configured to guide light within a first field of view to the first image sensor. The second lens carried may be configured to guide light within a second field of view to the second image sensor. The first image sensor may be configured to generate a first visual output signal conveying first visual information based on light that becomes incident thereon. The first visual information may define first visual content. The second image sensor may be configured to generate a second visual output signal conveying second visual information based on light that becomes incident thereon. The second visual information may define second visual content. The first lens and the second lens may be carried by the housing such that a peripheral portion of the first field of view and a peripheral portion of the second field of view overlap. The overlap of the peripheral portion of the first field of view and the peripheral portion of the second field of view may enable spherical capture of visual content based on stitching of the first visual content and the second visual content.

A graphical user interface may be presented on the electronic display. The graphical user interface may include an exposure mode element and/or other interface elements. The exposure mode element may enable switching of image capture device operation between a single lens exposure mode and a multi-lens exposure mode. The single lens exposure mode may include use of a first luminance of a scene included within the first field of view of the first lens to determine a group exposure setting for the first image sensor and the second image sensor. The multi-lens exposure mode may include use of the first luminance of the scene included within the first field of view of the first lens to determine a first exposure setting for the first image sensor and use of a second luminance of the scene included within the second field of view of the second lens to determine a second exposure setting for the second image sensor.

User input to switch the image capture device operation between the single lens exposure mode and the multi-lens exposure mode may be received based on user interaction with the exposure mode element. Responsive to the image capture device operation in the single lens exposure mode, the first visual content and the second visual content may be captured by applying the group exposure setting to the first image sensor and the second image sensor. Responsive to the image capture device operation in the multi-lens exposure mode, the first visual content may be captured by applying the first exposure setting to the first image sensor and the second visual content may be captured by applying the second exposure setting to the second image sensor. Combined visual content may be generated based on stitching of the first visual content and the second visual content.

A housing may carry one or more components of an image capture device. The housing may carry (be attached to, support, hold, and/or otherwise carry) one or more of an electronic storage, an electronic display, a first image sensor, a second image sensor, a first lens a second lens, a processor, and/or other components.

The electronic storage may store information relating to the image capture device, information relating to components of the image capture device, visual information, information relating to visual content captured by the image capture device, information relating to graphical user interface, information relating to interface elements, information relating to user interaction with the image capture device, and/or other information.

The first image sensor may be configured to generate a first visual output signal conveying first visual information based on light that becomes incident thereon. The first visual information may define first visual content. The second image sensor may be configured to generate a second visual output signal conveying second visual information based on light that becomes incident thereon. The second visual information may define second visual content.

The first lens may be configured to guide light within a first field of view to the first image sensor. The second lens may be configured to guide light within a second field of view to the second image sensor. The first lens and the second lens may be carried by the housing such that a peripheral portion of the first field of view and a peripheral portion of the second field of view overlap. The overlap of the peripheral portion of the first field of view and the peripheral portion of the second field of view may enable spherical capture of visual content based on stitching of the first visual content and the second visual content.

The electronic display may be configured to visually present information. The electronic display may include one or more touchscreen displays. In some implementations, the electronic display may be configured to present a live preview of the first visual content or the second visual content.

The processor(s) may be configured by machine-readable instructions. Executing the machine-readable instructions may cause the processor(s) to facilitate controlling exposure of multiple image sensors. The machine-readable instructions may include one or more computer program components. The computer program components may include one or more of a graphical user interface component, a user input component, an exposure mode component, and/or other computer program components.

The graphical user interface component may be configured to present one or more graphical user interfaces on the electronic display. The graphical user interface(s) may include one or more interface elements. The graphical user interface(s) may include an exposure mode element and/or other interface elements. The exposure mode element may enable switching of image capture device operation between a single lens exposure mode and a multi-lens exposure mode. The single lens exposure mode may include use of a first luminance of a scene included within the first field of view of the first lens to determine a group exposure setting for the first image sensor and the second image sensor. The multi-lens exposure mode may include use of the first luminance of the scene included within the first field of view of the first lens to determine a first exposure setting for the first image sensor and use of a second luminance of the scene included within the second field of view of the second lens to determine a second exposure setting for the second image sensor.

In some implementations, an exposure setting (e.g., the group exposure setting, the first exposure setting for the first image sensor, the second exposure setting for the second image sensor) may define an exposure time and/or an ISO value for the capture of visual content by one or more image sensors. The group exposure setting may define an exposure time and/or an ISO value for the capture of the first visual content by the first image sensor and the capture of the second visual content by the second image sensor. The first exposure setting may define an exposure time and/or an ISO value for the capture of the first visual content by the first image sensor. The second exposure setting may define an exposure time and/or an ISO value for the capture of the second visual content by the second image sensor.

In some implementations, the graphical user interface(s) may further include a direction element. The direction element may enable switching between the use of the first luminance of the scene included within the first field of view of the first lens and the use of the second luminance of the scene included within the second field of view of the second lens to determine the group exposure setting for the first image sensor and the second image sensor.

In some implementations, the electronic display may switch between the live preview of the first visual content and the live preview of the second visual content responsive to user input to switch between the use of the first luminance of the scene included within the first field of view of the first lens and the use of the second luminance of the scene included within the second field of view of the second lens to determine the group exposure setting for the first image sensor and the second image sensor. The electronic display may present the live preview of the first visual content during the use of the first luminance of the scene included within the first field of view of the first lens to determine the group exposure setting for the first image sensor and the second image sensor. The electronic display may present the live preview of the second visual content during the use of the second luminance of the scene included within the second field of view of the second lens to determine the group exposure setting for the first image sensor and the second image sensor.

The user input component may be configured to receive user input to switch the image capture device operation between the single lens exposure mode and the multi-lens exposure mode. The user input to switch the image capture device operation between the single lens exposure mode and the multi-lens exposure mode may be received based on user interaction with the exposure mode element.

In some implementations, the user input component may be configured to receive user input to switch between the use of the first luminance of the scene included within the first field of view of the first lens and the use of the second luminance of the scene included within the second field of view of the second lens to determine the group exposure setting for the first image sensor and the second image sensor. The user input to switch between the use of the first luminance and the use of the second luminance to determine the group exposure setting may be received based on user interaction with the direction element.

The exposure mode component may be configured to capture visual content by applying one or more exposure settings to the first image sensor and the second image sensor. Responsive to the image capture device operation in the single lens exposure mode, the first visual content and the second visual content may be captured by applying the group exposure setting to the first image sensor and the second image sensor. Responsive to the image capture device operation in the multi-lens exposure mode, the first visual content may be captured by applying the first exposure setting to the first image sensor, and the second visual content may be captured by applying the second exposure setting to the second image sensor.

Combined visual content may be generated based on stitching of the first visual content and the second visual content. In some implementations, the combined visual content may include spherical visual content. The spherical visual content may have a spherical field of view of 360 degrees. In some implementations, the combined visual content may include panoramic visual content. The panoramic visual content may have a panoramic field of view greater than the first field of view of the first lens or the second field of view of the second lens. The panoramic field of view may be less than 360 degrees. In some implementations, a center portion of the second visual content may not be included within the panoramic visual content.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
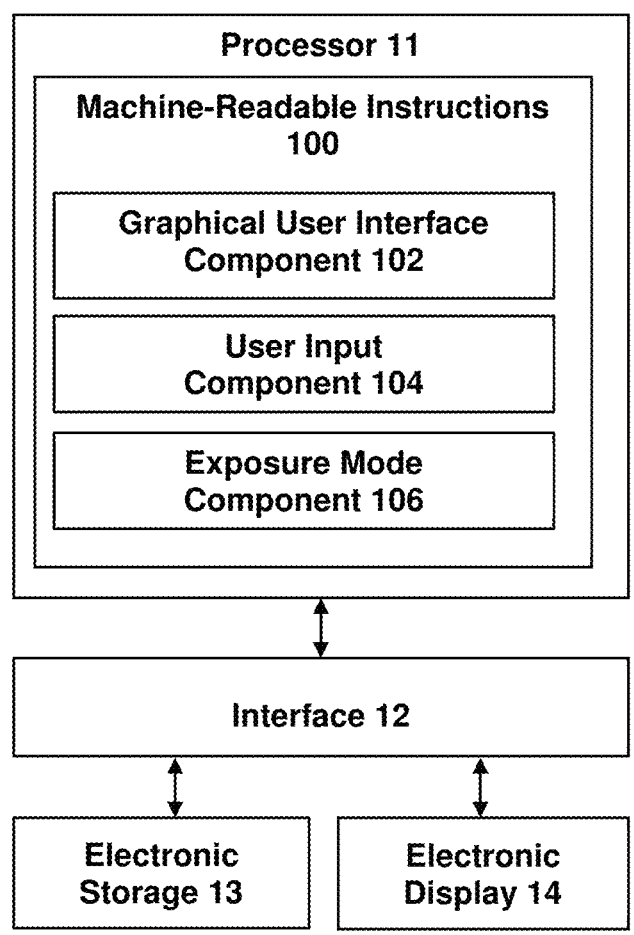
FIG. 1 illustrates an example system for controlling exposure of multiple image sensors.

FIG. 1 illustrates a system 10 for controlling exposure of multiple image sensors. The system 10 may include one or more of a processor 11, an interface 12 (e.g., bus, wireless interface), an electronic storage 13, and/or other components. The system 10 may include and/or be part of an image capture device. The image capture device may include a housing, and one or more of the processor 11, the interface 12, electronic storage 13, the electronic display 14, and/or other components of the system 10 may be carried by the housing of the image capture device. The image capture device may include other components, such as multiple lenses (a first lens, a second lens) and multiple image sensors (a first image sensor, a second image sensor).

The first lens of the image capture device may be configured to guide light within a first field of view to the first image sensor, and the second lens of the image capture device may be configured to guide light within a second field of view to the second image sensor. The fields of view of the individual lenses may be greater than or equal to 180 degrees. The first image sensor may be configured to generate a first visual output signal conveying first visual information based on light that becomes incident thereon, with the first visual information defining first visual content. The second image sensor may be configured to generate a second visual output signal conveying second visual information based on light that becomes incident thereon, with the second visual information may define second visual content. The first lens and the second lens may be carried by the housing such that a peripheral portion of the first field of view and a peripheral portion of the second field of view overlap. The overlap of the peripheral portion of the first field of view and the peripheral portion of the second field of view may enable spherical capture of visual content based on stitching of the first visual content and the second visual content.

The electronic display 14 may be configured to visually present information. A graphical user interface may be presented on the electronic display 14. The graphical user interface may include an exposure mode element and/or other interface elements. The exposure mode element may enable switching of image capture device operation between a single lens exposure mode and a multi-lens exposure mode. The single lens exposure mode may include use of a first luminance of a scene included within the first field of view of the first lens to determine a group exposure setting for the first image sensor and the second image sensor. The multi-lens exposure mode may include use of the first luminance of the scene included within the first field of view of the first lens to determine a first exposure setting for the first image sensor and use of a second luminance of the scene included within the second field of view of the second lens to determine a second exposure setting for the second image sensor.

User input to switch the image capture device operation between the single lens exposure mode and the multi-lens exposure mode may be received by the processor 11 based on user interaction with the exposure mode element. Responsive to the image capture device operation in the single lens exposure mode, the first visual content and the second visual content may be captured by the processor 11 by applying the group exposure setting to the first image sensor and the second image sensor. Responsive to the image capture device operation in the multi-lens exposure mode, the first visual content may be captured by applying the first exposure setting to the first image sensor and the second visual content may be captured by the processor 11 by applying the second exposure setting to the second image sensor. Combined visual content may be generated based on stitching of the first visual content and the second visual content.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store information relating to the image capture device, information relating to components of the image capture device, visual information, information relating to visual content captured by the image capture device, information relating to graphical user interface, information relating to interface elements, information relating to user interaction with the image capture device, and/or other information. The electronic storage 13 may include non-transitory, machine-readable storage media. The non-transitory machine-readable storage media may include permanent memory and/or temporary memory. The electronic storage 13/the non-transitory, machine-readable storage media may store information defining content that has been captured by the image capture device.

Visual content may refer to content of image(s), video frame(s), and/or video(s) that may be consumed visually. For example, visual content may be included within one or more images and/or one or more video frames of a video. The video frame(s) may define/contain the visual content of the video. A video may include video frame(s) that define/contain the visual content of the video. Video frame(s) may define/contain visual content viewable as a function of progress through the progress length of the video content. A video frame may include an image of the video content at a moment within the progress length of the video. As used herein, the term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files.

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, the electronic storage 13 and/or the electronic display 14 of the system 10 may be carried by the housing of the image capture device. The housing of the image capture device may carry other components of the system 10, such as the processor 11. References to a housing of an image capture device may refer to the image capture device, and vice versa.

An image capture device may refer to a device that captures visual content. An image capture device may capture visual content in the form of images, videos, and/or other forms. An image capture device may refer to a device for recording visual information in the form of images, videos, and/or other media. An image capture device may capture other content, such as audio content using one or more sound sensors. An image capture device may capture metadata (e.g., position data, movement data) relating to the visual content and/or audio content. An image capture device may be a standalone device (e.g., camera, action camera, image sensor) or may be part of another device (e.g., part of a smartphone, tablet).

Figure 3:
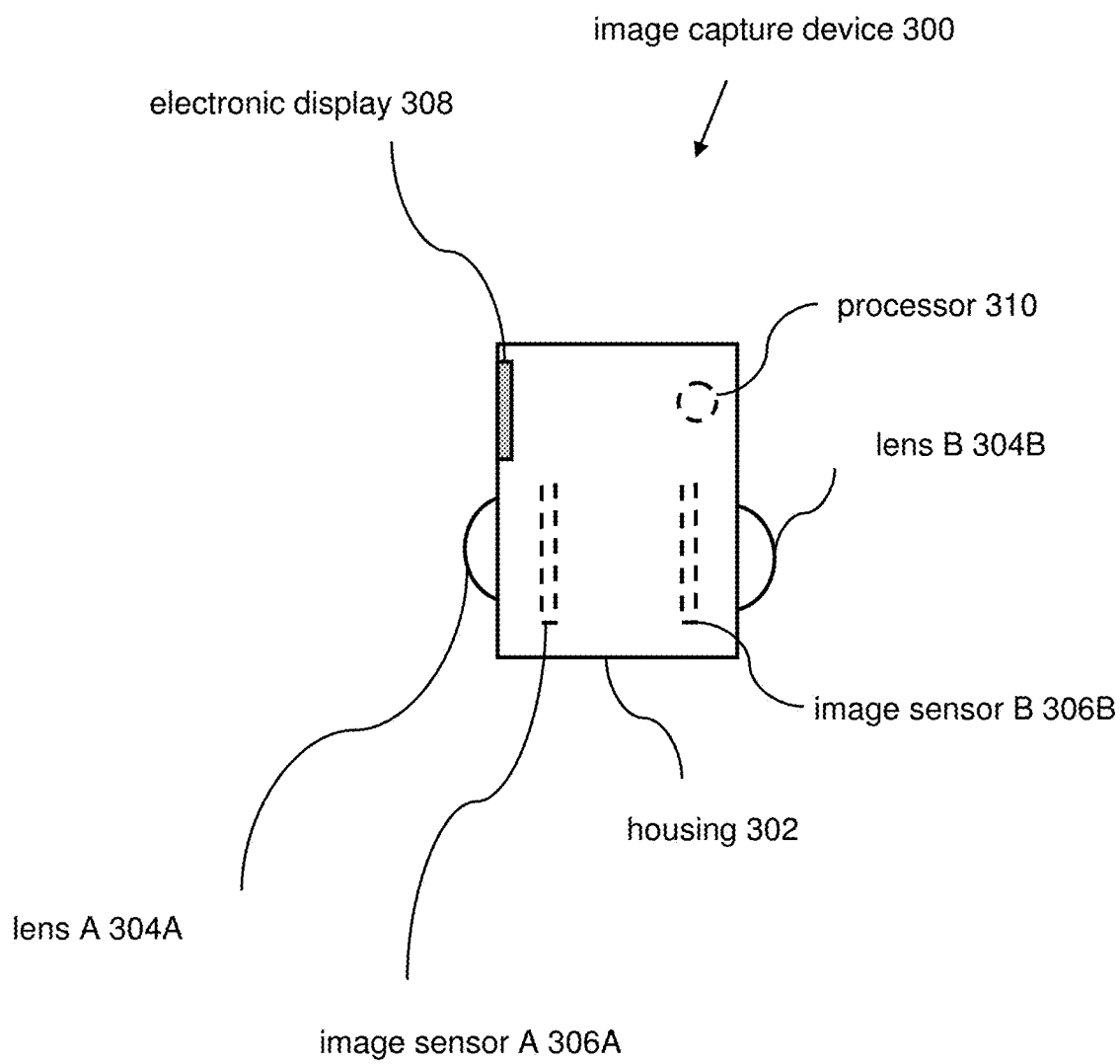
FIG. 3 illustrates an example image capture device.

FIG. 3 illustrates an example image capture device 300. Visual content (e.g., of image(s), video frame(s)), audio content, metadata relating to the visual content and/or audio content, and/or other content may be captured by the image capture device 300. The image capture device 300 may include a housing 302. The housing 302 may refer a device (e.g., casing, shell) that covers, protects, and/or supports one or more components of the image capture device 300. The housing 302 may include a single-piece housing or a multi-piece housing. The housing 302 may carry one or more components of the image capture device 300. The housing 302 may carry (be attached to, support, hold, and/or otherwise carry) one or more of a lens A 304A, a lens B 304B, an image sensor A 306A, an image sensor B 306B, an electronic display 308, a processor 310, and/or other components.

One or more components of the image capture device 300 may be the same as, be similar to, and/or correspond to one or more components of the system 10. For example, the processor 310 may be the same as, be similar to, and/or correspond to the processor 11. The electronic display 308 may be the same as, be similar to, and/or correspond to the electronic display 14.

While FIG. 3 shows the image capture device 300 with a single electronic display, this is merely an example and is not meant to be limiting. The image capture device 300 may include other numbers of electronic display. The image capture device 300 may include other components not shown in FIG. 3. The image capture device 300 may not include one or more components shown in FIG. 3. For example, the image capture device 300 may include one or more sound sensors. The image capture device 300 may include other configurations of the components shown in FIG. 3. For example, the lenses of the image capture device 300 may be staggered so that the optical centers of the lenses are not aligned with each other. Other configurations of image capture devices are contemplated.

The lens A 304A and the lens B 304B may include instrument(s), tool(s), and/or medium that acts upon light passing through the instrument(s)/tool(s)/medium. The lens A 304A and the lens B 304B may affect direction, deviation, and/or path of the light passing through the lens A 304A and the lens B 304B. The lens A 304A and the lens B 304B may have one or more fields of view. The lens A 304A and the lens B 304B may have the same field of view or different fields of view.

The lens A 304A may be configured to guide light within a field of view to the image sensor A 306A, and the lens B 304B may be configured to guide light within a field of view to the image sensor B 306B. A field of view of a lens may refer to the field of view of a scene that is within the field of view of the lens and/or the field of view of the scene that is delivered to an image sensor by the lens. For example, the lens A 304A may guide light within its field of view to the image sensor A 306A or may guide light within a portion of its field of view to the image sensor A 306A. A field of view of a lens may refer to the extent of the observable world that is seen through the lens. A field of view of a lens may include one or more angles (e.g., vertical angle, horizontal angle, diagonal angle) at which light is received and passed on by the lens to an image sensor.

The fields of view of the lens A 304A and the lens B 304B may be greater than or equal to 180-degrees. The lens A 304A and the lens B 304B may be carried by the housing 302 such that a peripheral portion of the field of view of the lens A 304A and a peripheral portion of the field of view of the lens B 304B overlap. The overlap of the peripheral portions of the fields of view of the lens A 304A and the lens B 304B may enable spherical capture of visual content based on stitching of the visual content captured by the image sensor A 306A and the visual content captured by the image sensor B 306B.

Stitching of visual content may include combining separate visual content (e.g., separate images/video frames) with overlapping fields of view to produce a wider field of view visual content. For example, the light guided to the image sensor A 306A by the lens A 304A may be used to generate one hemispherical view of a scene (with at least 180 field of view), and the light guided to the image sensor B 306B by the lens B 304B may be used to generate another (opposing) hemispherical view of the scene. Separate visual content captured by the image sensors 306A, 306B may be stitched along a stitch line to generate a spherical view of the scene. A stitch line may refer to a line that divides one visual content from another visual content. A stitch line may refer to a line at which separate visual content are combined. A stitch line for stitching of separate visual content captured by the image sensors 306A, 306B may be positioned within the overlap of the peripheral portions of the fields of view of the lenses 304A, 304B.

The image sensor A 306A and the image sensor B 306B may include sensor(s) that converts received light into output signals. The output signals may include electrical signals. The image sensors 306A, 306B may be configured to generate output signals conveying information that defines visual content of one or more images and/or one or more video frames of a video. The image sensors 306A, 306B may be configured to generate a visual output signal based on light that becomes incident thereon during a capture duration and/or other information. The visual output signal may convey visual information that defines visual content having a field of view. The image sensor A 306A may be configured to generate a visual output signal conveying visual information based on light that becomes incident thereon. The visual information may define visual content captured by the image sensor A 306A through the lens A 304A. The image sensor B 306B may be configured to generate a visual output signal conveying visual information based on light that becomes incident thereon. The visual information may define visual content captured by the image sensor B 306B through the lens B 304B.

The visual information may define visual content by including information that defines one or more content, qualities, attributes, features, and/or other aspects of the visual content. For example, the visual information may define visual content of an image by including information that makes up the content of the image, and/or information that is used to determine the content of the image. For instance, the visual information may include information that makes up and/or is used to determine the arrangement of pixels, characteristics of pixels, values of pixels, and/or other aspects of pixels that define visual content of the image. For example, the visual information may include information that makes up and/or is used to determine pixels of the image. Other types of visual information are contemplated.

Capture of visual content by the image sensors 306A, 306B may include conversion of light received by the image sensors 306A, 306B into output signals/visual information defining visual content. Capturing visual content may include recording, storing, and/or otherwise capturing the visual content for use in providing live previews of the visual content (e.g., live preview of images, videos) and/or for use in generating the visual content for storage (e.g., recording images, videos). For example, during a capture duration, the visual output signals generated by the image sensors 306A, 306B and/or the visual information conveyed by the visual output signals may be used to record, store, and/or otherwise capture the visual content for use in providing live previews and/or for use in recording.

The image capture device 300 may include other sensors. For example, the image capture device 300 may include one or more sound sensors to capture audio content. A sound sensor may include sensor(s) (e.g., microphone, component(s) of microphone) that converts received sounds into output signals. The output signals may include electrical signals. The sound sensor may generate output signals conveying information based on sounds received by the sound sensor. For example, the sound sensor may be configured to generate an audio output signal conveying audio information based on the sounds received by the sound sensor. The audio information may define audio content. The audio information may define audio content by including information that defines one or more content, qualities, attributes, features, and/or other aspects of the audio content. For example, the audio information may define audio content by including information that makes up the content of the audio, and/or information that is used to determine the content of the audio. The audio content may include one or more reproductions of the received sounds. The audio information may define audio content in one or more formats, such as WAV, MP3, MP4, RAW, and/or other formats.

The image capture device 300 may include one or more location sensors (e.g., GPS sensors) to measure location of the image capture device and/or one or more position sensors (e.g., gyroscope, accelerometer, inertial measurement unit) to measure position, movement, and/or orientation of the image capture device. In some implementations, information about location, position, and/or movement of the image capture device may be stored as metadata of other content (e.g., visual content, audio content) captured by the image capture device.

The electronic display 308 may include an electronic device that provides visual presentation of information. The electronic display 308 may include a color display and/or a non-color display. The electronic display 308 may be configured to visually present information. The electronic display 308 may be configured to present visual content, one or more graphical user interfaces, and/or other information. The electronic display 308 may be configured to present a live preview of the visual content captured by the image sensor A 306A and/or the visual content captured by the image sensor B 306B. A graphical user interface may include a graphical form that enables a user to interact with the image capture device 300 and/or see information provided by the image capture device 300. A graphical user interface may include one or more interface elements. The interface element(s) may enable presentation of information to the user and/or reception of user input to control the image capture device 300.

The electronic display 308 may include one or more touchscreen displays. The electronic display 308 may include one or more touch-sensitive screens and/or other components. A user may engage with the electronic display 308 by touching one or more portions of a touch-sensitive screen (e.g., with one or more fingers, stylus). The electronic display 308 may be configured to receive user input via a user's engagement with the electronic display 308. A user may engage with the electronic display 308 via interaction with one or more touch-sensitive surfaces/screens and/or other components of the electronic display 308. The electronic display 308 may be configured to receive user input to change the operation of the image capture device (e.g., change setting, start recording, stop recording). For example, the electronic display 308 may present one or more options for a user to provide input to the image capture device 300, such as by presenting one or more virtual (soft) buttons. The user may change the operation of the image capture device 300 by engaging one or more fingers on the location of the electronic display 308 corresponding to the virtual button(s). The electronic display 308 may be configured to generate output signals indicating location of the user's engagement with the electronic display 308. User input (to change operation of the image capture device) may be received/determined based on the output signals generated by the electronic display 308.

The processor 310 may include one or more processors (logic circuitry) that provide information processing capabilities in the image capture device 300. The processor 310 may provide one or more computing functions for the image capture device 300. The processor 310 may operate/send command signals to one or more components of the image capture device 300 to operate the image capture device 300. For example, the processor 310 may facilitate operation of the image capture device 300 in capturing image(s) and/or video(s), facilitate operation of the lenses 304A, 304B (e.g., change how light is guided by the lenses 304A, 304B), and/or facilitate operation of the image sensors 306A, 306B (e.g., change how the received light is converted into information that defines images/videos and/or how the images/videos are post-processed after capture).

The processor 310 may obtain information from the image sensors 306A, 306B and/or facilitate transfer of information from the image sensor 306A, 306B to another device/component. The processor 310 may obtain information from other sensor(s) and/or facilitate transfer of information from other sensor(s) to another device/component. The processor 310 may be remote from the processor 11 or local to the processor 11. One or more portions of the processor 310 may be remote from the processor 11 and/or one or more portions of the processor 310 may be part of the processor 11. In some implementations, the processor 310 may include and/or perform one or more functionalities of the processor 11 shown in FIG. 1. In some implementations, one or more functionalities of the processor 11 may be performed separately from the processor 310. For example, the image capture device 310 may be paired with a mobile device (e.g., smartphone, tablet). The mobile device may include an electronic display (e.g., the electronic display 14) and the one or more functionalities of the processor 11 may be performed by the processor(s) of the mobile device.

The image capture device 300 may be used to generate wide field of view visual content (e.g., spherical visual content, panoramic visual content). The wide field of view visual content may be generated by combining (stitching) visual content captured through separate lenses (the lenses 304A, 304B). The exposure settings of the image sensors 306A, 306B may be determined differently based on use of different exposure modes by the image capture device 300.

In a multi-lens exposure mode, the exposure setting of an image sensor may be determined based on the luminance of the scene received through the corresponding lens. For example, the exposure setting for the image sensor A 306A may be determined using the luminance of the scene included within the field of view of the lens A 304A, while the exposure setting for the image sensor B 306B may be determined using the luminance of the scene included within the field of view of the lens B 304B. In a single lens exposure mode, the exposure settings of multiple image sensors may be determined based on the luminance of the scene received through a single lens. For example, a group exposure setting for both the image sensor A 306A and the image sensor B 306B may be determined using the luminance of the scene included within the field of view of the lens A 304A or the lens B 304B.

Interface element(s) (virtual button(s)) presented on the electronic display 308 may enable a user to switch the operation of the image capture device 300 between the multi-lens exposure mode and the single lens exposure mode. Interface element(s) presented on the electronic display 308 may enable a user to specify which lens/image sensor will be used to determine the group exposure setting for both image sensors. Such options may provide the user with greater creative control in how visual content is captured.

For example, use of the multi-lens exposure mode may produce undesirable results in certain situations. For instance, mounting of an image capture device in a point-of-view configuration (e.g., mounted on a user's chest, mounted in front of a helmet) may result in one of the lenses being partially obscured. Use of the multi-lens exposure mode to independently determine the exposure settings for individual images sensors may result in mismatch in visual characteristics (e.g., brightness, contrast, detail) of separate visual content captured through separate image sensors. Mismatch in the visual characteristics of the separate visual content may result in an uneven look when the separate visual content are combined.

The user may switch the image capture device between operating in the multi-lens exposure mode and the single lens exposure mode by interacting with the interface element(s) presented on an electronic display. For example, the user may switch the image capture device between operating in the multi-lens exposure mode and the single lens exposure mode by interacting with an exposure mode element presented on an electronic display. Use of the single lens exposure mode to determine a single group exposure setting for both image sensors may result in the separate visual content captured through separate image sensors having matching visual characteristics. Wide field of view visual with a cohesive look may be generated when the separate visual content are combined. Such operation of the image capture device may enable visual content with a wide field of view to be generated. The wide field of view of the combined visual content may be larger than the field of view of visual content captured through a single lens/image sensor. The combined visual content may be generated as image(s)/video(s) and/or used to generate other image(s)/video(s). For example, the combined visual content may be generated as ultra-wide point of view image(s)/video(s) and/or may be used to provide greater flexibility/area in placement of viewing window(s) for cropping to generate image(s)/video(s).

The user may switch which of the lenses/image sensors are used to determine the group exposure setting for the images sensors by interacting with the interface element(s) presented on an electronic display. For example, the user may switch which of the lenses/image sensors are used to determine the group exposure setting for the images sensors by interacting with a direction element presented on an electronic display. User interaction with the direction element may change whether the group exposure setting for multiple image sensors are determined using the luminance of the scene included the field of view of one lens or another lens.

User interaction with the direction element may change the live preview of the visual content being presented on the electronic display. When operating in the multi-lens exposure mode, user interaction with the direction element may cause the image capture device to switch the live preview between separate visual content captured through separate image sensors. For example, referring to FIG. 3, when the image capture device is presenting a live preview of the visual content captured by the image sensor A 306A, user interaction with the direction element may cause the image capture device to switch the live preview on the electronic display 308 to present a live preview of the visual content captured by the image sensor B 306B.

When operating in the single lens exposure mode, user interaction with the direction element may cause the image capture device to (1) switch the live preview between separate visual content captured through separate image sensors and (2) change which of the lenses/image sensors are used to determine the group exposure setting. The visual content being shown in the live preview may include the visual content captured through the lens/image sensor that are being used to determine the group exposure setting. For example, referring to FIG. 3, when the image capture device 300 is using the luminance of the scene included within the field of view of the lens A 304A to determine the group exposure setting for the image sensors 306A, 306B, a live preview of the visual content captured by the image sensor A 306A may be presented on the electronic display 308. User interaction with the direction element may cause the image capture device 300 to (1) switch the live preview on the electronic display 308 to present a live preview of the visual content captured by the image sensor B 306B, and (2) change the group exposure setting determination from using the luminance of the scene included within the field of view of the lens A 304A to using the luminance of the scene included within the field of view of the lens B 304B.

Referring back to FIG. 1, the processor 11 (or one or more components of the processor 11) may be configured to obtain information to facilitate controlling exposure of multiple image sensors. Obtaining information may include one or more of accessing, acquiring, analyzing, determining, examining, identifying, loading, locating, opening, receiving, retrieving, reviewing, selecting, storing, and/or otherwise obtaining the information. The processor 11 may obtain information from one or more locations. For example, the processor 11 may obtain information from a storage location, such as the electronic storage 13, electronic storage of information and/or signals generated by one or more sensors, electronic storage of a device accessible via a network, and/or other locations. The processor 11 may obtain information from one or more hardware components (e.g., an image sensor, an electronic display, a touchscreen display) and/or one or more software components (e.g., software running on a computing device).

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate controlling exposure of multiple image sensors. The machine-readable instructions 100 may include one or more computer program components. The machine-readable instructions 100 may include one or more of a graphical user interface component 102, a user input component 104, an exposure mode component 106, and/or other computer program components.

The graphical user interface component 102 may be configured to present one or more graphical user interfaces on the electronic display 14 and/or other electronic display(s). A graphical user interface may refer to a user interface that provides information to a user and/or enables a user to interact with the system 10 through one or more interface elements of the graphical user interface. A graphical user interface may include a static configuration of interface elements and/or dynamic configurations of interface elements that changes (e.g., with time, based on mode/setting of the image capture device).

A graphical user interface may include one or more interface elements. An interface element may refer to a graphical element of the graphical capture user interface, such as window, icon, button, graphic, and/or other visual indicator. An interface element may visually provide information and/or enable a user to provide inputs to the system 10. For example, an interface element may visually provide information determined by the system 10 and/or a user may interact (e.g., engage, toggle, manipulate) with an interface element (virtual button) to provide one or more input to the system 10. A user may interact with an interface element to control the image capture device. For example, a user may interact with an interface element to change setting or mode of the image capture device, cause the image capture device to start content capture, cause the image capture device to stop content capture, and/or otherwise control the image capture device. A user may interact with an interface element by interacting with (e.g., tapping, pressing, holding a finger on) the location of the electronic display 14 corresponding to the interface element.

A graphical user interface may include an exposure mode element and/or other interface elements. An exposure mode element may refer to an interface element that allows a user to provide input to the image capture device to switch the operation of the image capture device (image capture device operation) between different exposure modes. The exposure mode element may enable switching of image capture device operation between a single lens exposure mode and a multi-lens exposure mode. Switching between other exposure modes is contemplated.

The single lens exposure mode may include use of a luminance of a scene included within a field of view of a single lens of an image capture device to determine a group exposure setting for multiple/all image sensors of the image capture device. The multi-lens exposure mode may include use of a luminance of a scene included within a field of view of a lens of an image capture device to determine an exposure setting for a corresponding image sensor (the image sensor that receives light from the lens). For example, the luminance of the scene included within the first field of view of one lens may be used to determine an exposure setting for one image sensor and the luminance of the scene included within the field of view of another lens may be used to determine a separate exposure setting for another image sensor.

An exposure setting (individual exposure setting, group exposure setting) may be determined based on luminance of the scene included within the field of view of a lens. Luminance may refer to brightness level within visual content. Luminance may refer to the intensity of light per unit area of light traveling in a given direction. An exposure setting may be determined based on total luminance, average luminance, distribution of luminance, difference in luminance, and/or other quantification of luminance of the scene included within the field of view of the lens. An exposure setting may be determined based on luminance within the entire field of view or within one or more parts of the field of view.

In some implementations, an exposure setting for an image sensor may be determined based on luminance the scene included within the field(s) of view of lens(es) for other image sensors. For example, an exposure setting for an image sensor may be determined based on luminance the scene included within the field of view of the lens for the image sensor and luminance the scene included within the field of view of the lens(es) for other image sensor(s).

In some implementations, an exposure setting for an image sensor may be determined based on content of the scene included within the field of view of the lens for the image sensor. Content of the scene may be determined based on visual analysis, visual recognition, computer vision, and/or other analysis of the visual content captured by the image sensor. Content of the scene may include identity of things depicted within the visual content, such as the type of environment included within the scene (e.g., beach, forest, snow, underwater, desert), number of things (e.g., persons, faces) included within the scene, position of things included within the scene, movement of objects included within the scene, visual aspects of things included within the scene (e.g., color, texture), and/or other aspects of things included within the scene.

An exposure setting may refer to one or more operation parameters of the image capture device that determines brightness of visual content captured by an image sensor. An exposure setting may refer to one or more operation parameters of the image capture device that controls how and/or the amount of light guided by a lens is exposed to the image sensor to convert into visual output signal/visual information. In some implementations, an exposure setting (e.g., group exposure setting, separate exposure settings for separate image sensors) may define one or more of an exposure time (duration of exposure) and/or an ISO value (film speed, image sensor sensitivity/gain), and/or other operating parameter for the capture of visual content by one or more image sensors. For example, a group exposure setting for multiple image sensors may define an exposure time and/or an ISO value for the capture of the visual content by the multiple image sensors. An exposure setting for a specific image sensor may define an exposure time and/or an ISO value for the capture of the visual content by the image sensor. In some implementations, an exposure setting may further define the aperture (opening size) and/or white balance (color balance).

In some implementations, a graphical user interface may further include a direction element. A direct element may refer to an interface element that allows a user to provide input to the image capture device to change how the group exposure setting is determined. A direct element may refer to an interface element that allows a user to provide input to the image capture device to set/change which lens/image sensor of the image capture device is used to determine the group exposure setting. The direction element may enable switching between the use of the luminance of the scene included within the field of view of one lens of the image capture device and the use of the luminance of the scene included within the field of view of another lens of the image capture device to determine the group exposure setting for the image sensors.

A direct element may refer to an interface element that allows a user to provide input to the image capture device to change a live preview of visual content being presented on the electronic display 14. A direct element may refer to an interface element that allows a user to provide input to the image capture device to set/change which of the visual content captured by the image sensors of the image capture device are presented on the electronic display 14. The direction element may enable switching between presentation of a live preview of visual content captured by one image sensor to presentation of a live preview of another visual content captured by another image sensor.

For example, first visual content may be captured through a first lens by a first image sensor and second visual content may be captured through a second lens by a second image sensor. The electronic display 14 may present a live preview of the first visual content and/or the second visual content. A live preview of visual content may include a view of the visual content being captured by the image capture device/image sensor. A live preview of visual content may include a view of the entirety of the visual content or one or more portions of the visual content.

The electronic display 14 may switch between the live preview of the first visual content and the live preview of the second visual content responsive to user input to switch between (1) the use of the luminance of the scene included within the field of view of the first lens and (2) the use of the luminance of the scene included within the field of view of the second lens to determine the group exposure setting for the first image sensor and the second image sensor. The electronic display 14 may present the live preview of the first visual content during the use of the luminance of the scene included within the field of view of the first lens to determine the group exposure setting for the first image sensor and the second image sensor. The electronic display 14 may present the live preview of the second visual content during the use of the luminance of the scene included within the field of view of the second lens to determine the group exposure setting for the first image sensor and the second image sensor.

Figure 4:
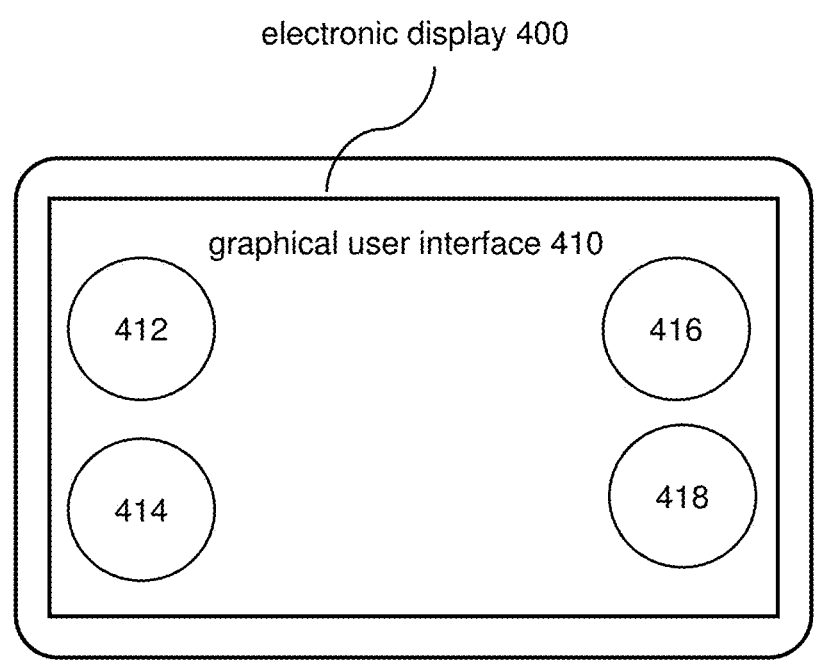
FIG. 4 illustrates an example graphical user interface presented on an electronic display.
Figure 5:
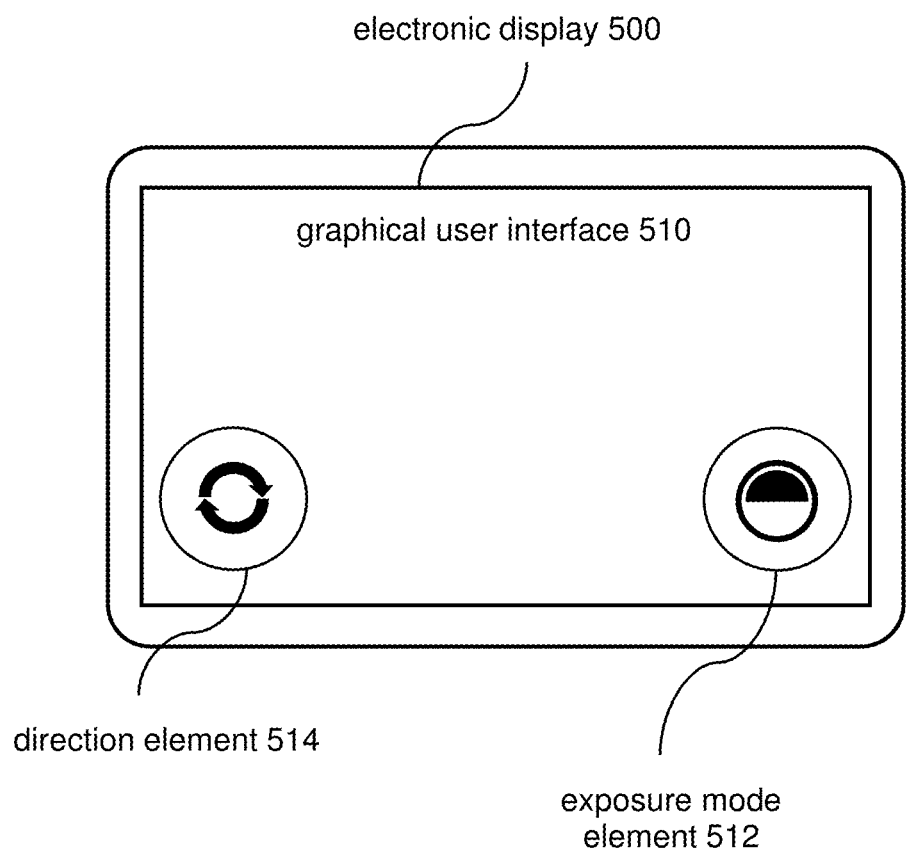
FIG. 5 illustrates an example graphical user interface presented on an electronic display.

FIGS. 4 and 5 illustrates example graphical user interfaces presented on an electronic display. The views of the graphical user interfaces in FIGS. 4 and 5 are provided merely as examples, and the arrangement and visual aspects of the graphical user interface may vary depending on the implementation. In some implementations, the graphical user interface may include additional features and/or alternative features. In some implementations, the graphical user interface may not include features shown in FIGS. 4 and/or 5. Other graphical user interfaces are contemplated.

Referring to FIG. 4, a graphical user interface 410 may be presented on an electronic display 400. The graphical user interface 410 may include interface elements 412, 414, 416, 418 and/or other interface elements. One or more of the interface elements 412, 414, 416, 418 may be an exposure mode element, a direction element, and/or other interface elements. The positions of the exposure mode element or a direction element on the graphical user interface may be user customizable. In some implementations, the exposure mode element may be hidden by default within the graphical user interface 410. A user may configure the graphical user interface 410 to show the exposure mode element (e.g., as one of the interface elements 412, 414, 416, 418). A user may interact with the graphical user interface 410 to cause the exposure mode element to be shown. For example, a user pressing and holding a finger within a part of the graphical user interface 410 may cause the exposure mode element to be shown.

A live preview of visual content captured by the image capture device may be presented on the electronic display 400. For example, the live preview may be presented within a part of the graphical user interface 410 or the live preview may fill the graphical user interface 410 (with the interface element 412, 414, 416, 418 covering parts of the live preview).

Referring to FIG. 5, a graphical user interface 510 may be presented on an electronic display 500. The graphical user interface 510 may include an exposure mode element 512, a direction element 514, and/or other interface elements. The exposure mode element 512 may be interacted upon by a user to input command to switch image capture device operation between different exposure modes. The exposure mode element 512 may be interacted upon by a user to input command to switch image capture device operation between a single lens exposure mode and a multi-lens exposure mode. The active/selected exposure mode may be visually indicated on the electronic display 510. For example, one or more visual characteristics (e.g., color, shape) of the exposure mode element 512 may change based on whether the single lens exposure mode or the multi-lens exposure mode is in operation. As another example, a message may be presented within the graphical user interface 510 to indicate the active/selected exposure mode. In some implementations, a message may be presented on the electronic display 500 to provide information about (e.g., guidance, explanation) of the exposure mode(s). One or more visual characteristics of the exposure mode element 512 may change based on which lens/image sensor of the image capture device is being used. For example, the location of the darker/colored side of the exposure mode element 512 may change based on which lens/image sensor of the image capture device is being used.

The direction element 514 may be interacted upon by a user to input command to switch which lens/image sensor of the image capture device is used to determine the group exposure setting. The direction element 514 may be interacted upon by a user to input command to change between the use of luminance of the scene included within the field of view of one lens to the use of luminance of the scene included within the field of view of another lens.

The direction element 514 may be interacted upon by a user to input command to switch which visual content being captured by the image capture device is presented as a live preview. The direction element 514 may be interacted upon by a user to input command to change the live preview being presented on the electronic display 500 from including visual content captured by one image sensor to including visual content captured by another image sensor.

The user input component 104 may be configured to receive user input to control the image capture device. Receiving user input to control the image capture device may include detecting, determining, discerning, discovering, finding, identifying, and/or otherwise receiving the user input to control the image capture device. A user may provide user input to control the image capture device by interacting with one or more interface elements on the electronic display 14 and/or other electronic display(s). The user input to control the image capture device may be received based on user interaction with the electronic display 14 and/or other electronic display(s). For example, receiving user input to control the image capture device may include determining how the user interacted with the interface elements on the electronic display 14. Receiving user input to control the image capture device may include interpreting user interaction with the interface elements on the electronic display 14 into one or more commands (e.g., command to change setting, command to change mode, command to start content capture, command to stop content capture).

For example, the user input component 104 may be configured to receive user input to switch the image capture device operation between different exposure modes. The user input component 104 may be configured to receive user input to switch the image capture device operation between the single lens exposure mode, the multi-lens exposure mode, and/or other exposure modes. The user input to switch the image capture device operation between different exposure modes may be received based on user interaction with the exposure mode element (presented on the electronic display 14 and/or other electronic display(s)).

As another example, the user input component 104 may be configured to receive user input to which lens/image sensor of the image capture device is used to determine the group exposure setting. The user input component 104 may be configured to receive user input to switch which visual content being captured by the image capture device is presented as a live preview. The user input to (1) switch the lens/image sensor of the image capture device used to determine the group exposure setting and/or (2) switch which visual content being captured by the image capture device is presented as a live preview may be received based on user interaction with the direction element (presented on the electronic display 14 and/or other electronic display(s)). For example, the user input component 104 may be configured to receive user input to switch between the use of the luminance of the scene included within the field of view of the first lens and the use of the luminance of the scene included within the field of view of the second lens to determine the group exposure setting for the first image sensor and the second image sensor. The user input to switch between the use of the first luminance and the use of the second luminance to determine the group exposure setting may be received based on user interaction with the direction element.

The exposure mode component 106 may be configured to capture visual content by applying one or more exposure settings to the first image sensor, the second image sensor, and/or other image sensors of the image capture device. The exposure mode component 106 may be configured to capture visual content based on the exposure setting(s) determined based on image capture device operation in the single lens exposure mode or the multi-lens exposure mode. The exposure mode component 106 may be configured to capture visual content by applying the exposure setting(s) determined based on image capture device operation in the single lens exposure mode or the multi-lens exposure mode to the corresponding image sensors. Applying an exposure setting to an image sensor may include operating the image sensor and/or other associated component (e.g., optical element, shutter) based on the exposure setting to capture visual content. Applying an exposure setting to an image sensor may include operating the image sensor and/or other associated component in accordance with the exposure setting to capture visual content.

Responsive to the image capture device operation in the single lens exposure mode, separate/multiple visual content may be captured by applying the group exposure setting to multiple/all image sensors. For example, first visual content may be captured by applying the group exposure setting to the image sensor A 306A and second visual content may be captured by applying the group exposure setting to the image sensor B 306B of the image capture device 300. The separate/multiple visual content may be captured by applying the same group exposure setting to the image sensor A 306A and the image sensor B 306B. The group exposure setting for both the image sensor A 306A and the image sensor B 306B may have been determined based on the luminance of the scene included within the field of view of the lens A 304A or the lens B 304B.

Responsive to the image capture device operation in the multi-lens exposure mode, separate/multiple visual content may be captured by applying individual exposure setting to the individual image sensors. For example, first visual content may be captured by applying a first exposure setting to the image sensor A 306A and second visual content may be captured by applying a second exposure setting to the image sensor B 306B. The first exposure setting for the image sensor A 306A may have been determined based on the luminance of the scene included within the field of view of the lens A 304A while the second exposure setting for the image sensor B 306B may have been determined based on the luminance of the scene included within the field of view of the lens B 304B.

The exposure mode component 106 may be configured to capture visual content one or more capture durations. A capture duration may refer to a time duration in which visual content is captured. Capturing visual content during a capture duration may include recording, storing, and/or otherwise capturing the visual content during the capture duration. The visual content may be captured for use in generating images and/or video frames, such as images and/or video frames having a wide field of view. The visual content may be captured for use in determining exposure settings.

For example, during a capture duration, the exposure mode component 106 may use the visual output signals generated by the image sensors 306A, 306B and/or the visual information conveyed by the visual output signals to record, store, and/or otherwise capture the visual content. The exposure mode component 106 may store, in the electronic storage 13 and/or other (permanent and/or temporary) electronic storage medium, information (e.g., the visual information) defining the visual content based on the visual output signals generated by the image sensors 306A, 306B and/or the visual information conveyed by the visual output signals during the capture duration. In some implementations, information defining the captured visual content may be stored in one or more visual tracks. In some implementations, the information defining the visual content may be discarded. For instance, the visual information defining the visual content may be temporarily stored for use in generating wide field of view visual content, and the visual information may be deleted after the generation of the wide field of view visual content.

Combined visual content may be generated using separate/multiple visual content captured by different image sensors of the image capture device. Combined visual content may be generated based on stitching of separate/multiple visual content captured by different image sensors of the image capture device. For example, combined visual content may be generated based on stitching of the visual content captured by the image sensor A 306A and the visual content captured by the image sensor B 306B. The combined visual content may have a wide field of view. The wide field of view of the combined visual content may be larger than the field of view of any individual lenses of the image capture device.

Combined visual content may be generated by the image capture device and/or another computing device. Combined visual content may be generated by the image capture device during/after capture of the visual content. Combined visual content may be generated by another computing device (e.g., mobile device/desktop device that obtains the visual content captured by the image capture device). The combined visual content may be stored in one or more storage media. For example, information defining the combined visual content (e.g., image file, video file) may be stored in the electronic storage 13, remote storage locations (storage media located at/accessible through a server), and/or other locations.

Figure 6A:
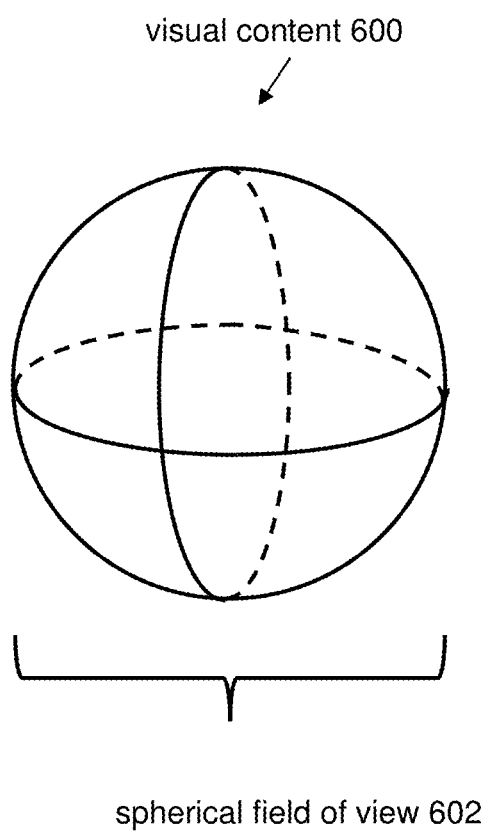
FIG. 6A illustrates an example of visual content captured by an image capture device.

In some implementations, the combined visual content may include spherical visual content. The spherical visual content may have a spherical field of view of 360 degrees. FIG. 6A illustrates an example of visual content 600 captured by an image capture device. The visual content 600 may have a spherical field of view 602. The visual content 600 may be generated by combining separate visual content captured by separate image sensors of the image capture device. For example, one hemisphere of the visual content 600 may have been captured by one image sensor (e.g., the image sensor A 306A) through one lens (e.g., the lens A 304A) of the image capture device, and the other hemisphere of the visual content 600 may have been captured by another image sensor (e.g., the image sensor B 306B) through another lens of the image capture device (e.g., the lens B 304B).

In some implementations, the combined visual content may include panoramic visual content. The panoramic visual content may have a panoramic field of view greater than the field of view of any individual lens of the image capture device. For example, the panoramic visual content may have a panoramic field of view greater than the field of view of the lens A 304A or the lens B 304B of the image capture device 300. The panoramic field of view may be less than 360 degrees. The panoramic visual content may be generated by combining some of the separate visual content captured by separate image sensors of the image capture device. For example, two hemispherical visual content may have been captured by two image sensors, and the panoramic visual content may be generated by combining one hemispherical visual content with a part of the other hemispherical visual content. As another example, two hemispherical visual content may have been captured by two image sensors, and the panoramic visual content may be generated by combining the two hemispherical visual content into spherical visual content, followed by cropping out of a part of the spherical visual content. Cropping of the spherical visual content may include removal of one or more parts of the spherical visual content.

Figure 6B:
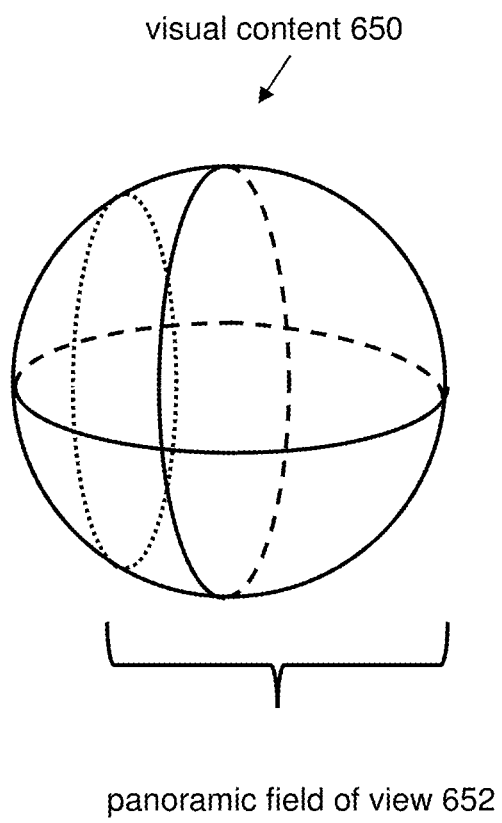
FIG. 6B illustrates an example of visual content captured by an image capture device.

For example, referring to FIG. 6B, visual content 650 may have a panoramic field of view 652. The visual content 650 may include combination of one hemispherical visual content and a part of another hemispherical visual content. A center portion of the other hemispherical visual content may not be included in the visual content 650.

In some implementations, the amount of the fields of view of the separate visual content included within the panoramic visual content may be set by a user. For example, a user may define how much of different visual content should be combined to generate the panoramic visual content and/or define how much of spherical visual content should be cropped out to generate the panoramic visual content. In some implementations, the amount of the fields of view of the separate visual content included within the panoramic visual content may be automatically determined. For example, the amount of the fields of view of the separate visual content included within the panoramic visual content may be automatically determined based on content of the scene included within the separate visual content. As another example, the amount of the fields of view of the separate visual content included within the panoramic visual content may be automatically determined based on luminance of the scene included within the fields of view of the lenses. The luminance of the scene included within the fields of view of the lenses may be used to determine what part and/or how much of the lenses are obscured (e.g., how much of a lens is obscured from the image captured device being attached to a chest of a user), and the amount of the fields of view of the separate visual content included within the panoramic visual content may be automatically determined based on what part and/or how much of the lenses are obscured. The amount of the fields of view of the separate visual content included within the panoramic visual content may be automatically determined to exclude those parts of the visual content that depict the obscured scene (e.g., depict the user/chest of the user).

Figure 7:
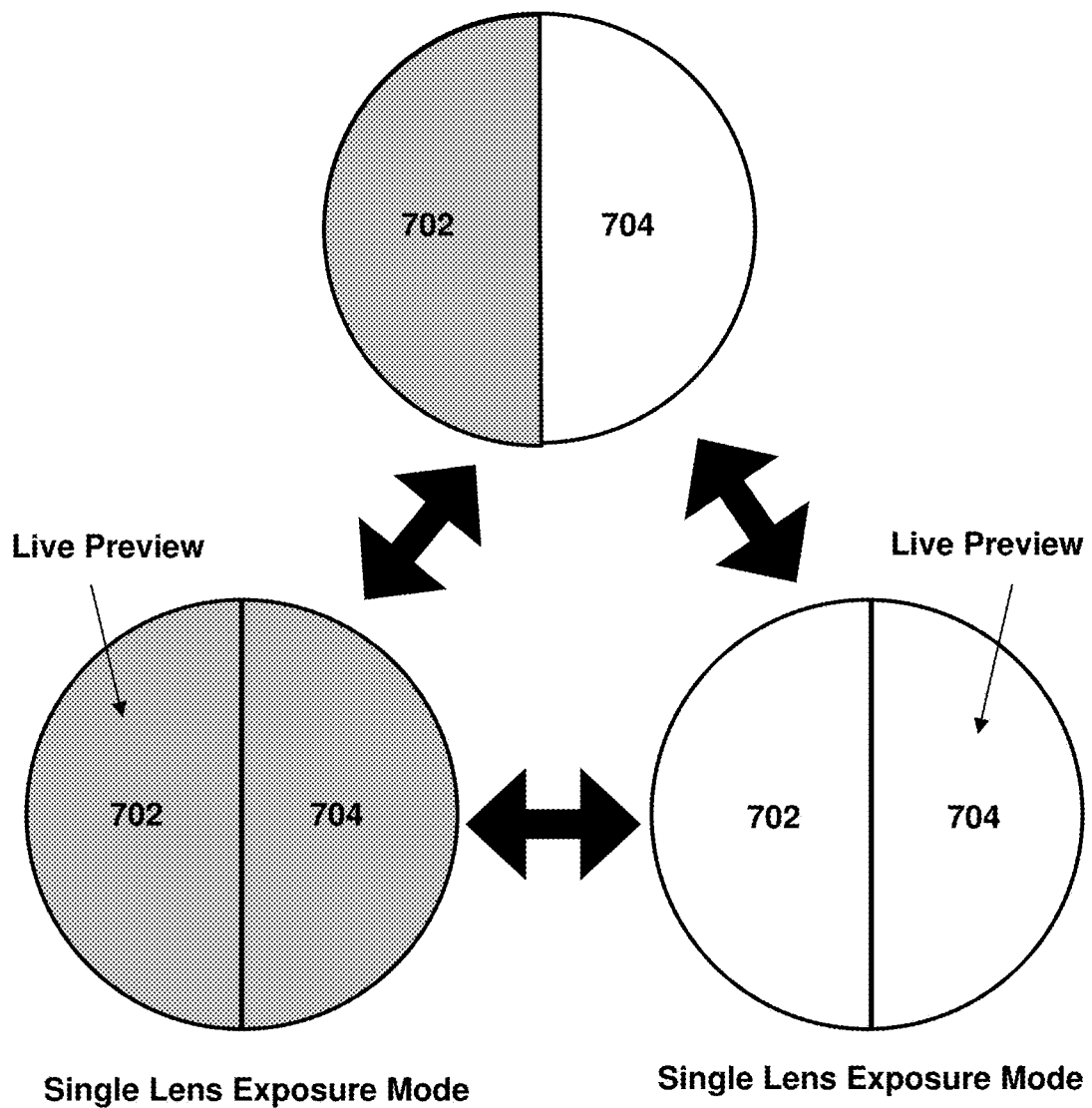
FIG. 7 illustrates example changes between a single lens exposure mode and a multi-lens exposure mode.

FIG. 7 illustrates example changes between a single lens exposure mode and a multi-lens exposure mode. In FIG. 7, visual content 702 may be captured by one image sensor through one lens (e.g., the lens A 304A) and visual content 704 may be captured by another image sensor through another lens (e.g., the lens B 304B). In the multi-lens exposure mode, exposure settings for the separate image sensors may be determined based on the luminance of the scene included within the field of view of the corresponding lens. For example, the exposure setting to capture the visual content 702 may be determined based on the luminance of the scene included within the field of view of the lens A 304A while the exposure setting to capture the visual content 704 may be determined based on the luminance of the scene included within the field of view of the lens B 304B. Difference in luminance of the scene included within the fields of view of the different lenses may result in the visual content 702 and the visual content 704 being captured using different exposure settings.

In the single lens exposure mode, the exposure settings for the separate image sensors may be determined based on the luminance of the scene included within the field of view of a single lens (e.g., the lens A 304A or the lens B 304B). For example, on the left, the group exposure setting to capture the visual content 702 and the visual content 704 may be determined based on the luminance of the scene included within the field of view of the lens A 304A. On the right, the group exposure setting to capture the visual content 702 and the visual content 704 may be determined based on the luminance of the scene included within the field of view of the lens B 304B.

A live preview of the visual content 702 or the visual content 704 may be shown on an electronic display. The live preview of the visual content 702/the visual content 704 may show entirety of the visual content 702/the visual content 704 or one or more portions of the visual content 702/the visual content 704. In the single lens exposure mode, the live preview may show the side of the visual content from which the group exposure setting is determined. For example, on the left, the live preview may show the visual content 702. On the right, the live preview may show the visual content 704. User interaction with a direction element (e.g., the direction element 514) may (1) switch the side from which the group exposure setting is determined and (2) change which visual content is shown within the live preview.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

While the implementations of the disclosure are described with respect to the system 10, this is merely as an example and is not meant to be limiting. In some implementation, some or all of the functionalities attributed herein to the system 10 may be performed by another system, one or more computing devices, and/or one or more processing apparatuses (e.g., tangible hardware/equipment that processes information). In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11, the electronic storage 13, and the electronic display 14 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
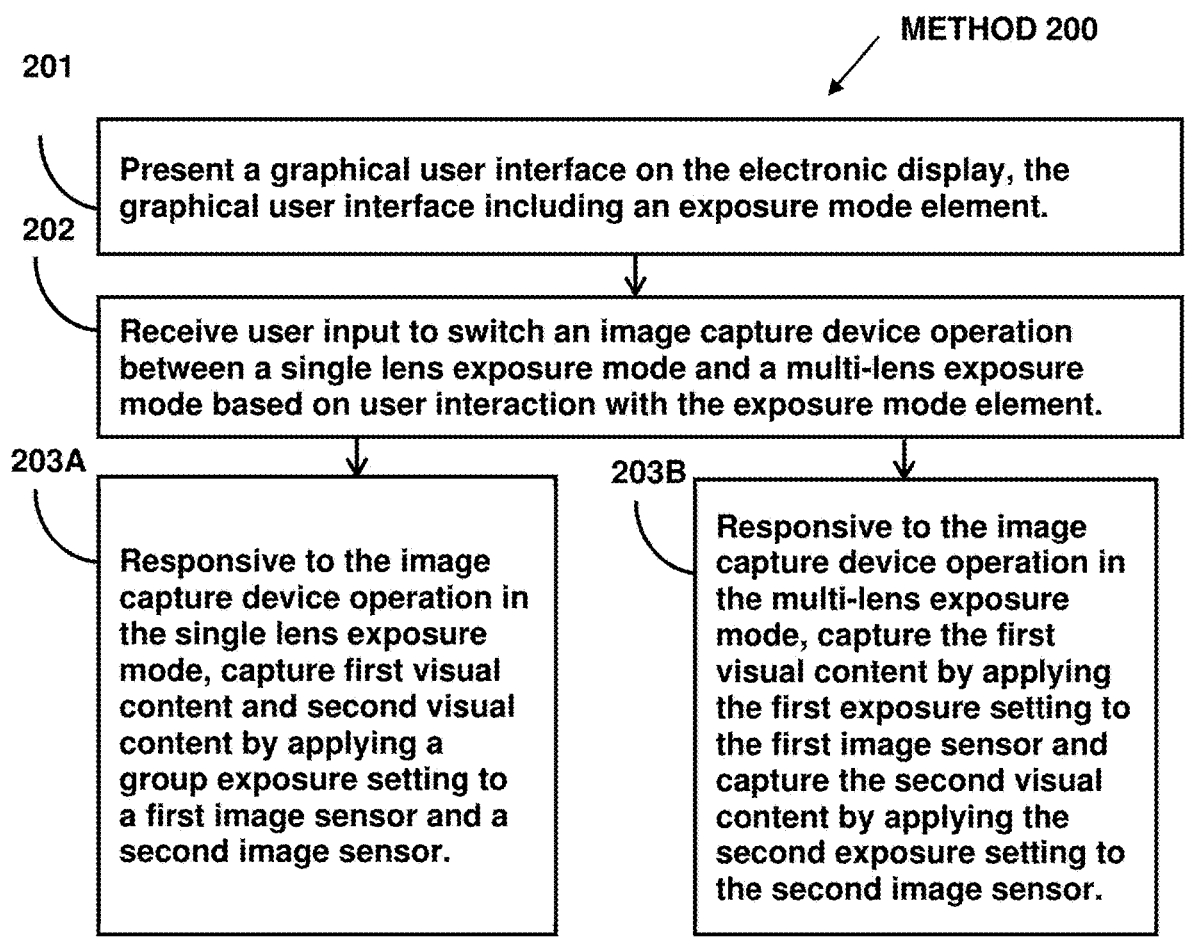
FIG. 2 illustrates an example method for controlling exposure of multiple image sensors.

FIG. 2 illustrates method 200 for controlling exposure of multiple image sensors. The operations of method 200 presented below are intended to be illustrative. In some implementations, method 200 may be accomplished with one or more additional operations not described, and/or without one or more of the operations discussed. In some implementations, two or more of the operations may occur simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, an image capture device may include a housing. The housing may carry one or more of an electronic display, a first lens, a second lens, a first image sensor, a second image sensor, and/or other components. The electronic display may be configured to visually present information. The first lens may be configured to guide light within a first field of view to the first image sensor. The second lens carried may be configured to guide light within a second field of view to the second image sensor. The first image sensor may be configured to generate a first visual output signal conveying first visual information based on light that becomes incident thereon. The first visual information may define first visual content. The second image sensor may be configured to generate a second visual output signal conveying second visual information based on light that becomes incident thereon. The second visual information may define second visual content. The first lens and the second lens may be carried by the housing such that a peripheral portion of the first field of view and a peripheral portion of the second field of view overlap. The overlap of the peripheral portion of the first field of view and the peripheral portion of the second field of view may enable spherical capture of visual content based on stitching of the first visual content and the second visual content.

At operation 201, a graphical user interface may be presented on the electronic display. The graphical user interface may include an exposure mode element and/or other interface elements. The exposure mode element may enable switching of image capture device operation between a single lens exposure mode and a multi-lens exposure mode. The single lens exposure mode may include use of a first luminance of a scene included within the first field of view of the first lens to determine a group exposure setting for the first image sensor and the second image sensor. The multi-lens exposure mode may include use of the first luminance of the scene included within the first field of view of the first lens to determine a first exposure setting for the first image sensor and use of a second luminance of the scene included within the second field of view of the second lens to determine a second exposure setting for the second image sensor. In some implementations, operation 201 may be performed by a processor component the same as or similar to the graphical user interface component 102 (Shown in FIG. 1 and described herein).

At operation 202, user input to switch the image capture device operation between the single lens exposure mode and the multi-lens exposure mode may be received based on user interaction with the exposure mode element. In some implementations, operation 202 may be performed by a processor component the same as or similar to the user input component 104 (Shown in FIG. 1 and described herein).

At operation 203A, responsive to the image capture device operation in the single lens exposure mode, the first visual content and the second visual content may be captured by applying the group exposure setting to the first image sensor and the second image sensor. Combined visual content may be generated based on stitching of the first visual content and the second visual content. In some implementations, operation 203A may be performed by a processor component the same as or similar to the exposure mode component 106 (Shown in FIG. 1 and described herein).

At operation 203B, responsive to the image capture device operation in the multi-lens exposure mode, the first visual content may be captured by applying the first exposure setting to the first image sensor and the second visual content may be captured by applying the second exposure setting to the second image sensor. Combined visual content may be generated based on stitching of the first visual content and the second visual content. In some implementations, operation 203B may be performed by a processor component the same as or similar to the exposure mode component 106 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. An image capture device for controlling exposure of multiple image sensors, the image capture device comprising:
   a housing;
   an electronic display carried by the housing and configured to visually present information;
   a first image sensor carried by the housing and configured to generate a first visual output signal conveying first visual information based on light that becomes incident thereon, the first visual information defining first visual content;
   a second image sensor carried by the housing and configured to generate a second visual output signal conveying second visual information based on light that becomes incident thereon, the second visual information defining second visual content;
   a first lens carried by the housing and configured to guide light within a first field of view to the first image sensor;
   a second lens carried by the housing and configured to guide light within a second field of view to the second image sensor, wherein:

the first lens and the second lens are carried by the housing such that a peripheral portion of the first field of view and a peripheral portion of the second field of view overlap; and the overlap of the peripheral portion of the first field of view and the peripheral portion of the second field of view enables spherical capture of visual content based on stitching of the first visual content and the second visual content; and one or more physical processors carried by the housing, the one or more physical processors configured by machine-readable instructions to:

present a graphical user interface on the electronic display, the graphical user interface including an exposure mode element and a direction element, the exposure mode element enabling switching of image capture device operation between a single lens exposure mode and a multi-lens exposure mode, the multi-lens exposure mode including use of a first luminance of a scene included within the first field of view of the first lens to determine a first exposure setting for the first image sensor and use of a second luminance of the scene included within the second field of view of the second lens to determine a second exposure setting for the second image sensor, the single lens exposure mode including use of either the first luminance of the scene included within the first field of view of the first lens or the second luminance of the scene included within the second field of view of the second lens to determine a group exposure setting for the first image sensor and the second image sensor, the direction element enabling user control over direction of luminance used for the group exposure setting, the direction element enabling user selection of whether the group exposure setting for the first image sensor and the second image sensor is determined based on the first luminance of the scene included within the first field of view of the first lens or the second luminance of the scene included within the second field of view of the second lens;

receive user input to switch the image capture device operation between the single lens exposure mode and the multi-lens exposure mode based on user interaction with the exposure mode element;

responsive to the image capture device operation in the single lens exposure mode, capture the first visual content and the second visual content by applying the group exposure setting to the first image sensor and the second image sensor;

during the image capture device operation in the single lens exposure mode, receive user input to switch the direction of luminance used for the group exposure setting based on user interaction with the direction element;

responsive to the user input to switch the direction of luminance used for the group exposure setting, switch between the use of the first luminance of the scene included within the first field of view of the first lens and the use of the second luminance of the scene included within the second field of view of the second lens to determine the group exposure setting for the first image sensor and the second image sensor; and responsive to the image capture device operation in the multi-lens exposure mode, capture the first visual content by applying the first exposure setting to the first image sensor and capture the second visual content by applying the second exposure setting to the second image sensor;

wherein:

the electronic display is configured to present a live preview of the first visual content or the second visual content; and combined visual content is generated based on stitching of the first visual content and the second visual content, the combined visual content including spherical visual content or panoramic visual content, the spherical visual content having a spherical field of view of 360 degrees, the panoramic visual content having a panoramic field of view greater than the first field of view of the first lens or the second field of view of the second lens, the panoramic field of view being less than 360 degrees.

2. The image capture device of claim 1, wherein the direction element further enables user control over direction of live preview presented on the electronic display, the direction of live preview presented on the electronic display corresponding to the direction of luminance used for the group exposure setting, further wherein the electronic display switches between the live preview of the first visual content captured through the first lens and the live preview of the second visual content captured through the second lens responsive to user input to switch between the use of the first luminance of the scene included within the first field of view of the first lens and the use of the second luminance of the scene included within the second field of view of the second lens to determine the group exposure setting for the first image sensor and the second image sensor.

3. An image capture device for controlling exposure of multiple image sensors, the image capture device comprising:

a housing;

an electronic display carried by the housing and configured to visually present information;

a first image sensor carried by the housing and configured to generate a first visual output signal conveying first visual information based on light that becomes incident thereon, the first visual information defining first visual content;

a second image sensor carried by the housing and configured to generate a second visual output signal conveying second visual information based on light that becomes incident thereon, the second visual information defining second visual content;

a first lens carried by the housing and configured to guide light within a first field of view to the first image sensor;

a second lens carried by the housing and configured to guide light within a second field of view to the second image sensor, wherein:

the first lens and the second lens are carried by the housing such that a peripheral portion of the first field of view and a peripheral portion of the second field of view overlap; and the overlap of the peripheral portion of the first field of view and the peripheral portion of the second field of view enables spherical capture of visual content based on stitching of the first visual content and the second visual content; and one or more physical processors carried by the housing, the one or more physical processors configured by machine-readable instructions to:

present a graphical user interface on the electronic display, the graphical user interface including an exposure mode element and a direction element, the exposure mode element enabling switching of image capture device operation between a single lens exposure mode and a multi-lens exposure mode, the multi-lens exposure mode including use of a first luminance of a scene included within the first field of view of the first lens to determine a first exposure setting for the first image sensor and use of a second luminance of the scene included within the second field of view of the second lens to determine a second exposure setting for the second image sensor, the single lens exposure mode including use of either the first luminance of the scene included within the first field of view of the first lens or the second luminance of the scene included within the second field of view of the second lens to determine a group exposure setting for the first image sensor and the second image sensor, the direction element enabling user control over direction of luminance used for the group exposure setting, the direction element enabling user selection of whether the group exposure setting for the first image sensor and the second image sensor is determined based on the first luminance of the scene included within the first field of view of the first lens or the second luminance of the scene included within the second field of view of the second lens;

receive user input to switch the image capture device operation between the single lens exposure mode and the multi-lens exposure mode based on user interaction with the exposure mode element;

responsive to the image capture device operation in the single lens exposure mode, capture the first visual content and the second visual content by applying the group exposure setting to the first image sensor and the second image sensor;

during the image capture device operation in the single lens exposure mode, receive user input to switch the direction of luminance used for the group exposure setting based on user interaction with the direction element;

responsive to the user input to switch the direction of luminance used for the group exposure setting, switch between the use of the first luminance of the scene included within the first field of view of the first lens and the use of the second luminance of the scene included within the second field of view of the second lens to determine the group exposure setting for the first image sensor and the second image sensor; and responsive to the image capture device operation in the multi-lens exposure mode, capture the first visual content by applying the first exposure setting to the first image sensor and capture the second visual content by applying the second exposure setting to the second image sensor;

wherein combined visual content is generated based on stitching of the first visual content and the second visual content.

4. The image capture device of claim 3, wherein the combined visual content includes spherical visual content, the spherical visual content having a spherical field of view of 360 degrees.

5. The image capture device of claim 3, wherein the combined visual content includes panoramic visual content, the panoramic visual content having a panoramic field of view greater than the first field of view of the first lens or the second field of view of the second lens, the panoramic field of view being less than 360 degrees.

6. The image capture device of claim 5, wherein a center portion of the second visual content is not included within the panoramic visual content.

7. The image capture device of claim 3, wherein the electronic display is configured to present a live preview of the first visual content or the second visual content.

8. The image capture device of claim 7, wherein the direction element further enables user control over direction of live preview presented on the electronic display, the direction of live preview presented on the electronic display corresponding to the direction of luminance used for the group exposure setting, further wherein the electronic display switches between the live preview of the first visual content captured through the first lens and the live preview of the second visual content captured through the second lens responsive to user input to switch between the use of the first luminance of the scene included within the first field of view of the first lens and the use of the second luminance of the scene included within the second field of view of the second lens to determine the group exposure setting for the first image sensor and the second image sensor.

9. The image capture device of claim 8, wherein:
the electronic display presents the live preview of the first visual content captured through the first lens during the use of the first luminance of the scene included within the first field of view of the first lens to determine the group exposure setting for the first image sensor and the second image sensor; and
the electronic display presents the live preview of the second visual content captured through the second lens during the use of the second luminance of the scene included within the second field of view of the second lens to determine the group exposure setting for the first image sensor and the second image sensor.

10. The image capture device of claim 3, wherein the group exposure setting defines an exposure time and an ISO value for the capture of the first visual content by the first image sensor and the capture of the second visual content by the second image sensor.

11. The image capture device of claim 5, wherein the panoramic visual content is generated by combining hemispherical visual content from the first visual content captured through the first lens and non-hemispherical visual content from the second visual content captured through the second lens.

12. A method for controlling exposure of multiple image sensors, the method performed by an image capture device including an electronic display, a first image sensor, a second image sensor, a first lens, a second lens, and one or more processors, the electronic display configured to visually present information, the first image sensor configured to generate a first visual output signal conveying first visual information based on light that becomes incident thereon, the first visual information defining first visual content, the second image sensor configured to generate a second visual output signal conveying second visual information based on light that becomes incident thereon, the second visual information defining second visual content, the first lens configured to guide light within a first field of view to the first image sensor, the second lens configured to guide light within a second field of view to the second image sensor, wherein the first lens and the second lens are carried by the image capture device such that a peripheral portion of the first field of view and a peripheral portion of the second field of view overlap, the overlap of the peripheral portion of the first field of view and the peripheral portion of the second field of view enabling spherical capture of visual content based on stitching of the first visual content and the second visual content, the method comprising:

presenting a graphical user interface on the electronic display, the graphical user interface including an exposure mode element and a direction element, the exposure mode element enabling switching of image capture device operation between a single lens exposure mode and a multi-lens exposure mode, the multi-lens exposure mode including use of a first luminance of a scene included within the first field of view of the first lens to determine a first exposure setting for the first image sensor and use of a second luminance of the scene included within the second field of view of the second lens to determine a second exposure setting for the second image sensor, the single lens exposure mode including use of either the first luminance of the scene included within the first field of view of the first lens or the second luminance of the scene included within the second field of view of the second lens to determine a group exposure setting for the first image sensor and the second image sensor, the direction element enabling user control over direction of luminance used for the group exposure setting, the direction element enabling user selection of whether the group exposure setting for the first image sensor and the second image sensor is determined based on the first luminance of the scene included within the first field of view of the first lens or the second luminance of the scene included within the second field of view of the second lens;

receiving user input to switch the image capture device operation between the single lens exposure mode and the multi-lens exposure mode based on user interaction with the exposure mode element;

responsive to the image capture device operation in the single lens exposure mode, capturing the first visual content and the second visual content by applying the group exposure setting to the first image sensor and the second image sensor;

during the image capture device operation in the single lens exposure mode, receiving user input to switch the direction of luminance used for the group exposure setting based on user interaction with the direction element;

responsive to the user input to switch the direction of luminance used for the group exposure setting, switching between the use of the first luminance of the scene included within the first field of view of the first lens and the use of the second luminance of the scene included within the second field of view of the second lens to determine the group exposure setting for the first image sensor and the second image sensor; and responsive to the image capture device operation in the multi-lens exposure mode, capturing the first visual content by applying the first exposure setting to the first image sensor and capturing the second visual content by applying the second exposure setting to the second image sensor;

wherein combined visual content is generated based on stitching of the first visual content and the second visual content.

13. The method of claim 12, wherein the combined visual content includes spherical visual content, the spherical visual content having a spherical field of view of 360 degrees.

14. The method of claim 12, wherein the combined visual content includes panoramic visual content, the panoramic visual content having a panoramic field of view greater than the first field of view of the first lens or the second field of view of the second lens, the panoramic field of view being less than 360 degrees.

15. The method of claim 14, wherein a center portion of the second visual content is not included within the panoramic visual content.

16. The method of claim 12, wherein the electronic display is configured to present a live preview of the first visual content or the second visual content.

17. The method of claim 16, wherein the direction element further enables user control over direction of live preview presented on the electronic display, the direction of live preview presented on the electronic display corresponding to the direction of luminance used for the group exposure setting, further wherein the electronic display switches between the live preview of the first visual content captured through the first lens and the live preview of the second visual content captured through the second lens responsive to user input to switch between the use of the first luminance of the scene included within the first field of view of the first lens and the use of the second luminance of the scene included within the second field of view of the second lens to determine the group exposure setting for the first image sensor and the second image sensor.

18. The method of claim 17, wherein:
the electronic display presents the live preview of the first visual content captured through the first lens during the use of the first luminance of the scene included within the first field of view of the first lens to determine the group exposure setting for the first image sensor and the second image sensor; and
the electronic display presents the live preview of the second visual content captured through the second lens during the use of the second luminance of the scene included within the second field of view of the second lens to determine the group exposure setting for the first image sensor and the second image sensor.

19. The method of claim 12, wherein the group exposure setting defines an exposure time and an ISO value for the capture of the first visual content by the first image sensor and the capture of the second visual content by the second image sensor.

20. The method of claim 14, wherein the panoramic visual content is generated by combining hemispherical visual content from the first visual content captured through the first lens and non-hemispherical visual content from the second visual content captured through the second lens.

* * * * *